H. K. SANDELL.
RECTIFIER.
APPLICATION FILED JUNE 6, 1914.

1,242,600.

Patented Oct. 9, 1917.

3 SHEETS—SHEET 1.

Witnesses:

Inventor:
Henry K. Sandell,
By Dyrenforth, Lee, Chritton & Wiles,
Attys.

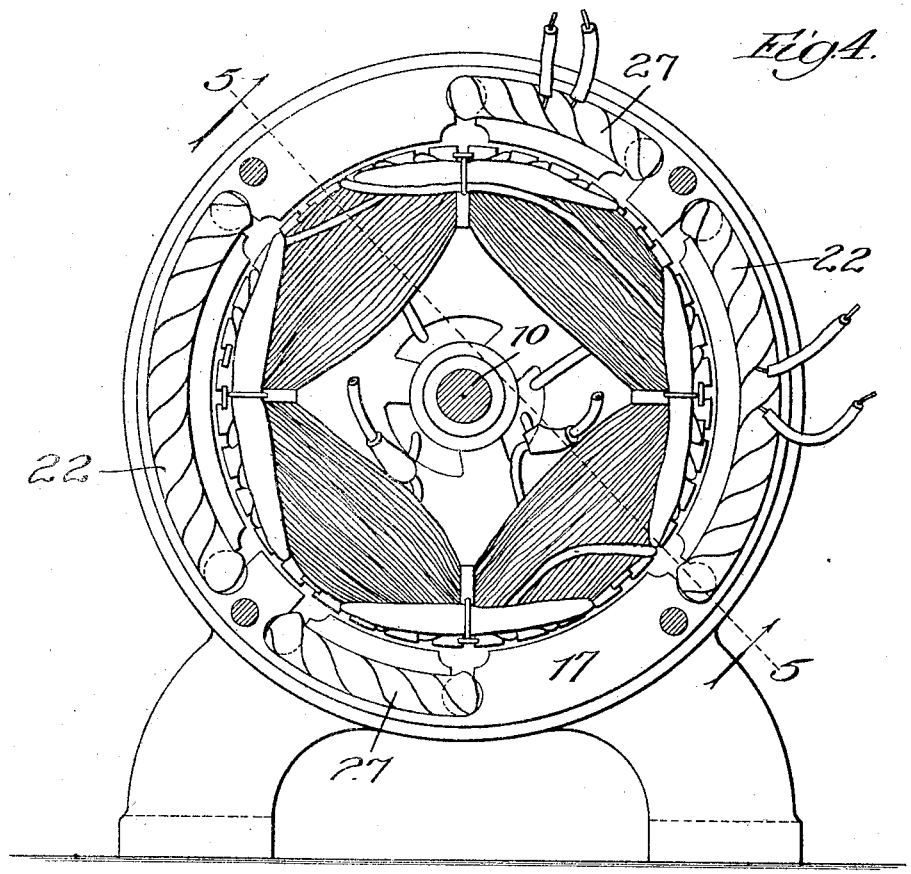
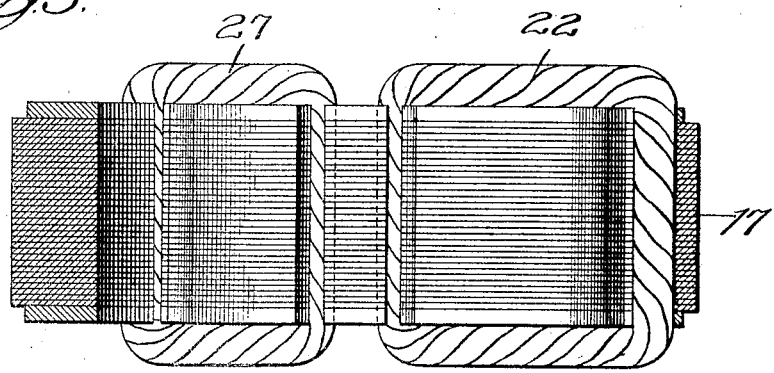

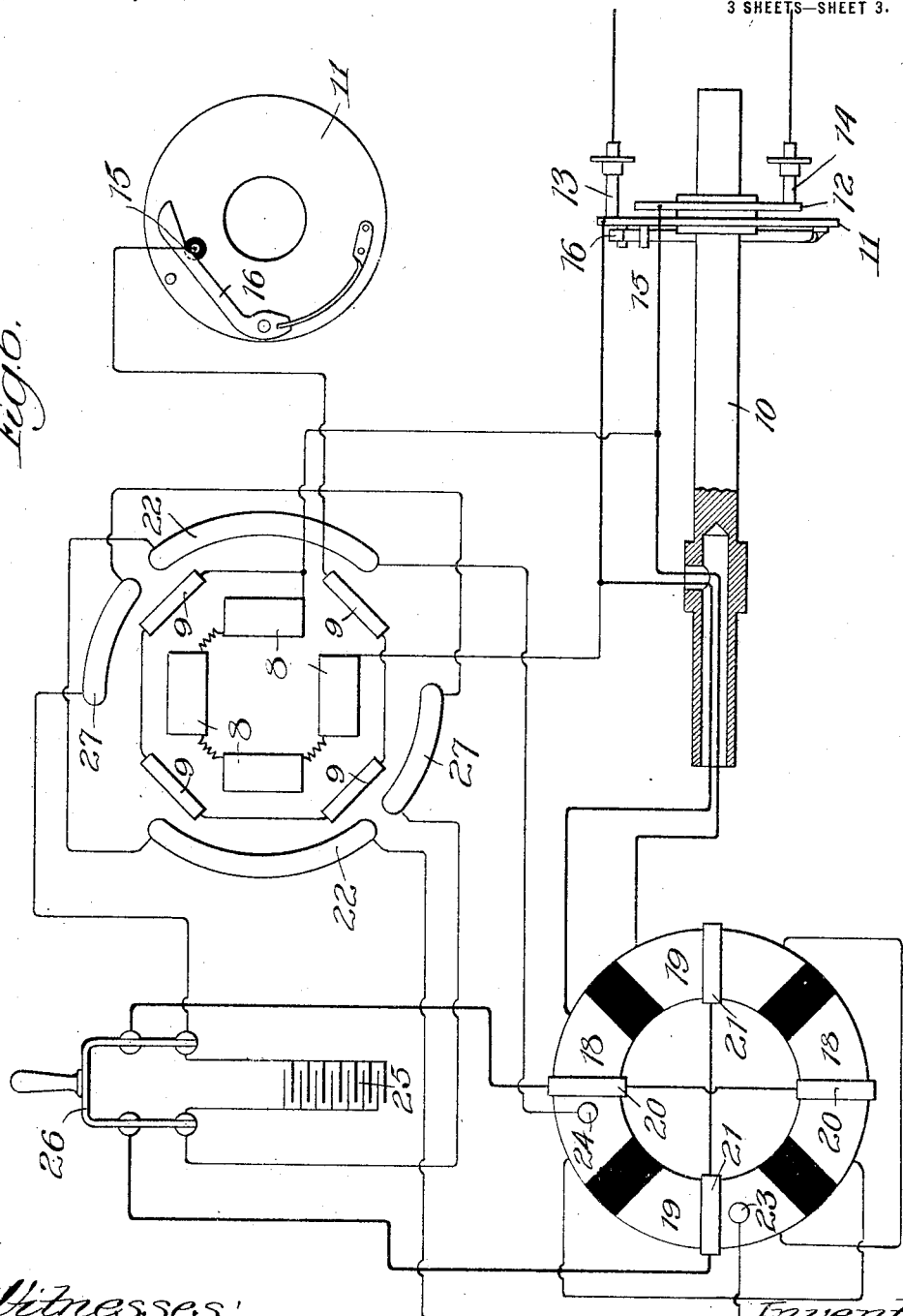

UNITED STATES PATENT OFFICE.

HENRY K. SANDELL, OF CHICAGO, ILLINOIS, ASSIGNOR TO HERBERT S. MILLS, OF CHICAGO, ILLINOIS.

RECTIFIER.

1,242,600.     Specification of Letters Patent.     Patented Oct. 9, 1917.

Application filed June 6, 1914. Serial No. 843,361.

*To all whom it may concern:*

Be it known that I, HENRY K. SANDELL, a citizen of the United States, residing at Chicago, in the county of Cook and State of Illinois, have invented a new and useful Improvement in Rectifiers, of which the following is a specification.

My invention relates to certain new and useful improvements in rectifiers, 'and is fully described and explained in the specification and shown in the accompanying drawings, in which—

Figure 1:
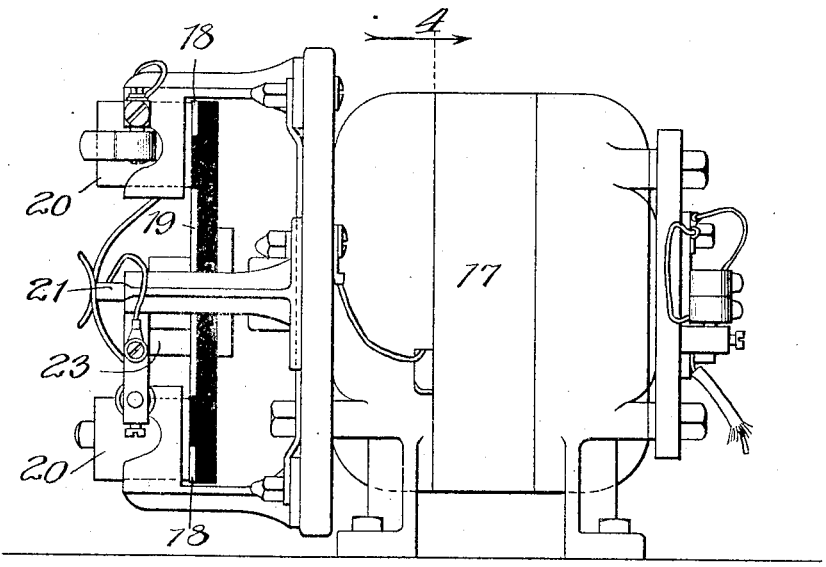
Figure 2:
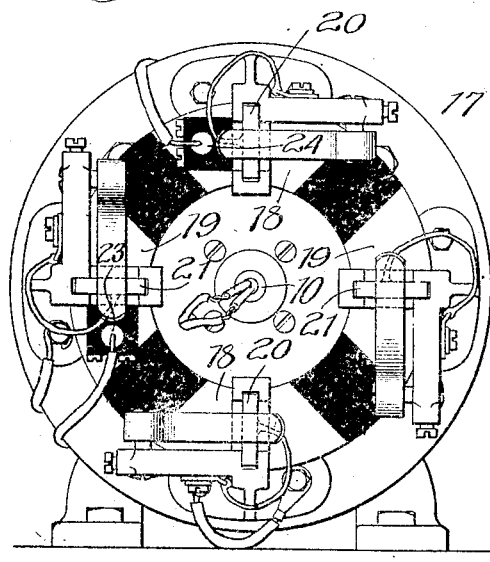
Figure 3:
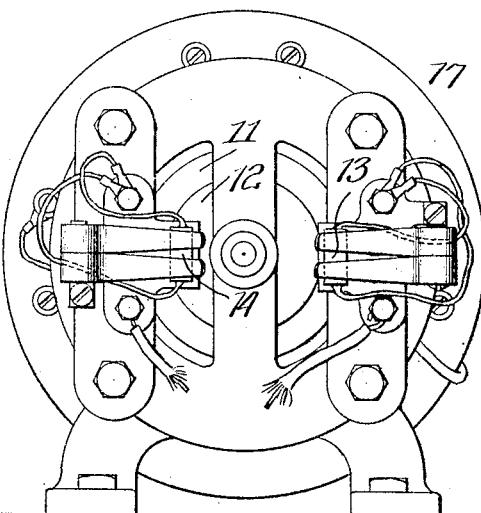

Figure 1 is a side elevation of my improved device. Fig. 2 is an elevation from the left of Fig. 1. Fig. 3 is an end view from the opposite end. Fig. 4 is a section on the line 4 of Fig. 1. Fig. 5 is a section on the broken line 5 of Fig. 4, and Fig. 6 is a diagrammatic view showing the circuit through the rectifier when used in charging a storage battery.

Referring to the drawings, the rectifier is provided with a rotor having coils 8 and starting coils 9. The rotor is carried by a shaft on which are mounted slip-rings 11 and 12 to which the alternating current to be rectified is led by the brushes 13 and 14, respectively. The terminals of the rotor coils 8 are connected to the two slip-rings. The starting coils 9 are connected at one end to the slip-ring 12, while their other end is connected to a pin 15 movable with but insulated from the slip-ring 13, but normally having electrical connection therewith through a centrifugally-operated contact-piece 16. When the rectifier gets up speed, the centrifugal motion of this contact-piece cuts out the starting coils in accordance with what is now common practice in the construction of induction motors. 17 is the stator which is of the induction type, preferably of ordinary squirrel cage construction.

At the opposite end of the rotor shaft is a commutator comprising segments 18 and 19, the similarly numbered segments being diametrically opposite to each other and in electrical connection. These segments on a single phase rectifier, such as that here illustrated, are equal in number to the pole pieces of the rotor. Brushes 20 and 21 bear upon these commutator segments, the similarly numbered brushes being oppositely placed and in electrical connection with each other. If desired, a single pair only of the brushes could be used, although I prefer to use the two pairs shown for the purpose of obtaining greater carrying capacity. Heavy lead-wires are run from the commutator segments to the slip-rings, respectively, these leads being run through a hollow of the rotor shaft as illustrated.

It will be evident from the foregoing construction that when the alternating current is supplied to the brushes 13 and 14, the rotor will commence to revolve after the manner of the rotor of any induction motor. In order to draw off direct current from the brushes 20 and 21, it is manifestly necessary only to secure synchronous rotation of the rotor. This is secured by interposing in the inductive or squirrel cage field a synchronizing coil which is here shown as divided into two parts 22. These coils receive current from two supplemental brushes 23 and 24. These synchronizing coils establish localized permanent poles in the stator, and they result in keeping the rotor in step and eliminating slip.

When the rectifier is used for its intended purpose of charging a storage battery, such as shown at 25, the main direct current brushes 20 and 21 are connected therewith by a switch 26, and at the commencement of the charging of the battery when its counter-electromotive force is very low, no other arrangement than that so far described would be necessary. As the battery approaches a full charge and its counter-electromotive force increases, there is a natural tendency for the battery current to flow backward at the low point of the current wave. It will be understood, of course, that when a single phase alternating current is rectified the resultant current is of a pulsatory character, the voltage for each pulsation varying from zero to a point considerably higher than the rated voltage of the alternating current employed. For instance, if the alternating current be a 110 volt current, each pulsation of the rectified current will vary from zero to about 160 volts. Manifestly, the moment the battery voltage is appreciable, current will tend to flow backward during all that part of the wave which is of less voltage. The sparking at the brushes which would occur on breaking this backward current is eliminated by two expedients. One of these expedients consists in making the spaces between the commutator segments of considerable size so that the portions of the electrical pulsations having the lowest voltage are discarded. With this expedient employed alone, however, it would be found that considerable sparking would occur at the brushes, excepting when the commutator cut-off occurred at an exact point on the wave corresponding to the battery voltage. For instance, if the seg-
ments are so designed as to discard all that part of the wave having a voltage of less than 50 volts, then during the first part of the charging of the battery the brushes will have to break a 50 volt current. As the voltage of the battery increases, this voltage will decrease until, when the battery voltage is 50, the sparking will be eliminated. But as the battery exceeds 50 volts there will be a reverse flow which will again cause sparking at the brushes. Now the second expedient which I have adopted for producing the desired result, consists in putting in the stator an additional coil shown as consisting of two parts 27, which are connected to the battery terminals.

The coil or coils 27 are so located in relation to the synchronizing coils 22 that when one rotor pole piece is opposed to a synchronizing coil, another pole piece has not quite reached the coil 27. Therefore, as the magnetic attraction of the coil 27 increases, the rotor moves forward from its normal position, always however remaining in step, but while in step advancing a fraction of a turn. The distance which it advances, of course, depends upon the voltage of the battery. It will be seen that the coil 27 is particularly effective as a magnetic regulator, because it receives continuously a current at least as high as the counter-electromotive force of the battery and periodically the higher voltage of the pulsatory wave when that exceeds the battery voltage, while the synchronizing coils 22 receive only the pulsating rectified current and are entirely without current during the periods when the insulating segments of the commutator are beneath the brushes 23 and 24. The difference in the effective power of the coils 22 and 27 is therefore determined by the flow from the battery to the coil 27 during the time when the coils 22 get no current whatever. The effective difference between the pulling power of the two coils therefore increases directly with the battery voltage. Thus the advance of the rotor, and the commutator segments with it, is proportionate to the battery voltage. Now, manifestly, as the rotor advances, it will cut off the pulsating wave at an earlier point, or at a point of constantly increasing voltage as the rotor advances. Therefore as the battery voltage increases, the point at which the brushes leave the commutator segments is of constantly higher voltage, whereby the breaking point is constantly maintained at approximately the same voltage as that of the battery, and thus the sparking at the brushes is eliminated. Obviously, as the rotor advances, the circuit closing point also becomes earlier, but this is not of material importance because there is no tendency to spark in making an electrical connection. Thus by advancing one member of the commutator in proportion to the electromotive force of the storage battery which is being charged, it is possible to eliminate all sparking at the brushes. Conversely if the alternating current voltage varies, the coil 27 will be effective to vary the point of commutator cut-off to eliminate sparking. Under such conditions, the synchronizing coils 22 will fall in strength relatively to the coil 27 so as to advance the point of commutator cut-off. If this shift did not occur, sparking would take place because of the difference in voltage at the time of the cut-off. If the alternating current voltage rises, the synchronizing coils 22 will become more powerful relative to the coil 27, thus retarding the point of commutator cut-off as would be necessary to secure the desired result.

The coil 27 has another and very important incidental result. It operates to so position the rotor that the rectified current is necessarily of the proper direction to charge the battery regardless of which way the battery is connected to the charging terminals. This can be best explained by giving an example: Suppose that the upper portion of the coil 27 in the drawing be a positive pole. It will then repel the rotor pole pieces while they are positive and attract them while they are negative, and the rotor poles, while maintaining their synchronous rotation, will always pass the coil 27 at a time in their rotation when their polarity is negative. Therefore as long as the upper coil 27 remains positive, the brush 20 will necessarily receive current of one polarity while the brush 21 will receive current of the opposite polarity. These brushes will of course be so connected to the battery terminals that the current flowing therefrom is of the polarity which is necessary to render the upper pole 27 positive as presupposed. Now if all the connections remain the same, but the battery wires running to the charging terminals be reversed, the flow through the coil 27 will be reversed and the rotor will then necessarily drop back a quarter of a turn so that its poles will be positive instead of negative when passing the coil 27. This, of course, will reverse the current flow from the brushes 20 and 21 so that it will be again of the proper direction to charge the battery in its reversed relation. Of course, it is supposed that at the time the charging of the battery by the rectifier is commenced there remains sufficient residual electromotive force in the battery to properly magnetize the coil 27. The present structure will not necessarily furnish current of the right polarity to a new battery, or a completely exhausted battery for charging the same, but when, as is required by proper storage battery practice, the battery contains a high residual electromotive force then it can simply be connected indifferently to the present rectifier and the current will necessarily flow into it in the proper direction.

I realize that considerable variation is possible in the details of the construction herein shown, and I do not intend to limit myself thereto, except as pointed out in the following claims, in which it is my intention to claim all the novelty inherent in the device as broadly as the state of the art will permit.

What I claim as new and desire to secure by Letters Patent is—

1. In combination, a commutator, means for conducting alternating current to the commutator segments, brushes bearing on the segments, storage battery charging terminals connected to said brushes, supplemental brushes in advance of said brushes, an alternating current motor for driving the commutator in step, said motor consisting of two members, coils in one member energized by the alternating current, synchronizing coils in the other member energized by direct current having connection with the supplemental brushes, other coils in said motor member having electrical connection with the charging terminals and positioned as their strength increases to vary the relative position of the motor members at corresponding times in the alternating wave, whereby automatically to vary the point of commutator cut-off in accordance with the counter-electromotive force of the battery being charged.

2. In combination, a commutator, means for conducting alternating current to one member thereof, storage battery charging terminals, means connecting the same to the other member of the commutator, an alternating current motor for driving the commutator in step, and two field coils in said motor in unsymmetrical magnetic relation to each other, means for conducting rectified current to one of said coils and battery current to the other of said coils, for the purpose set forth.

3. In a rectifier, an alternating current motor arranged to run in step and provided with two field coils in unsymmetrical relation to each other, a rectifying commutator driven by the motor, storage battery charging terminals, and leads from the storage battery to one of the field coils, for the purpose set forth.

4. In a rectifier, a motor having a rotor, coils in the rotor energized by the alternating current, an inductive stator, a commutator carried by the rotor, alternating current leads to the commutator segments, brushes bearing on the commutator segments, storage battery charging terminals connected to said brushes, supplemental brushes bearing on the commutator segments in advance of said first-named brushes, synchronizing coils in the inductive stator receiving rectified current from said supplemental brushes, and regulating coils in unsymmetrical position with reference to the regulating coils and receiving current from the battery being charged and operating, as their magnetic strength increases, to shift to effective poles of the stator in accordance with the electromotive force of the battery being charged to vary the point of commutator cut-off.

5. In combination, a commutator, brushes for taking off the rectified current, battery charging leads connected to said brushes, a synchronous motor comprising two members, means for supplying alternating current to one member, the other member having two windings one of which receives direct current and the other of which is connected to the said brushes in shunt with the battery being charged.

6. In combination, a rectifying commutator, battery charging leads supplied thereby, a synchronous motor and poles in the synchronous motor in shunt with the battery.

7. In combination, a rectifying commutator, a synchronous motor driven thereby, battery charging leads supplied by the commutator, the motor having a composite pole provided with two windings one of which receives direct current and the other of which is connected to the commutator in shunt with the battery.

In testimony whereof I have hereunto set my hand this 4th day of June, 1914.

HENRY K. SANDELL.

In presence of two subscribing witnesses:
O. C. AVISUS,
D. C. THORSEN.